United States Patent [19]

Stemme et al.

[11] 4,445,139
[45] Apr. 24, 1984

[54] DEVICE FOR THE ELECTRONIC SCANNING OF IMAGES

[75] Inventors: Otto Stemme; Wolfgang Ruf, both of Munich; Eduard Wagensonner, Aschheim, all of Fed. Rep. of Germany

[73] Assignee: Agfa - Gevaert AG, Leverkusen, Fed. Rep. of Germany

[21] Appl. No.: 124,789

[22] Filed: Feb. 25, 1980

[30] Foreign Application Priority Data

Mar. 5, 1979 [DE] Fed. Rep. of Germany ....... 2908533

[51] Int. Cl.³ ............................................. H04N 3/36
[52] U.S. Cl. .................................................. 358/214
[58] Field of Search ........................ 358/214, 215, 216

[56] References Cited

U.S. PATENT DOCUMENTS

4,149,191 4/1979 Longchamp ..................... 358/214

Primary Examiner—Robert L. Richardson
Attorney, Agent, or Firm—Michael J. Striker

[57] ABSTRACT

An electronic image scanner is disclosed in various embodiments. Scanning of an image is divided into a first reproduction phase and a second reproduction phase. In the first reproduction phase, a first half-frame of a video signal is developed. In the second reproduction phase, a second half-frame of the video signal is developed. By utilizing the invention herein, a flicker-free video signal can be developed from a motion picture film while maintaining resolution of the resultant video signal at the conventional television resolution standard of 625 lines per film frame.

20 Claims, 11 Drawing Figures

DEVICE FOR THE ELECTRONIC SCANNING OF IMAGES

BACKGROUND OF THE INVENTION

1. Field of the Invention

The invention relates to a device for the electronic scanning of images, particularly of transparent images, for reproduction on a television receiver.

2. Description of the Prior Art

In conventional scanning devices which utilize CCD's, the image of every film frame is continually moved across the photodiode line of the charge coupled device. Integration of the signals from the photodiodes will ensue as long as each respective frame or television line lasts (64 $\mu$sec.). In the prior art, the image line will move across two lines of a full television frame during one line period, as opposed to the one line per one line period relationship existing in conventional television systems. This has the disadvantage that the vertical resolution of the frame will only be one half of the television resolution. It would thus be advantageous to adapt the vertical image resolution of the image scanned to that of a television image, namely 625 lines per frame.

SUMMARY OF THE INVENTION

In this invention, this is achieved by providing control means in the reproduction or scanning device or in the evaluation circuit. The control means is synchronized with the television lines, controlling the integration of the signals of the image line and the next image line but one during a first reproduction phase. Relative to line location, integration of the signals of one image line (and subsequently of the signals of the next line but one) will ensue first, integration of the signals of the intermediate next image lines ensuing in a second reproduction phase. By this technique, the same vertical resolution of the image is achieved as is achieved in television images with image element scanning. It will also not be necessary to provide a photo diode line for every image line.

In a further embodiment, either the reproduction device or the scanning device will contain a tilting-mirror system, deflecting film frames or their images at the standard television frequency of 50 Hz. Onto the continual sawtooth oscillating motion of the tilting mirror is superimposed a periodic control function, preferably of rectangular pulses at television line frequency, in such a manner that the motion of an image line across the photodiode line during a line period will be slowed or interrupted, while the respective image line will be given a jerky vertical motion at the end of a line period.

Thus, advantageously, the signals of an image line during a line period or major portion thereof will be integrated, whilst during the remaining portion of the line period the mirror will execute its jerky vertical motion. During the jerky motion of the mirror, the integration value will be negligible.

The width of the full photodiode line will, in an advantageous manner, be less than or equal to the distance between the loci of two adjacent image lines, so that the distance travelled by each image line during the first portion of the line period will be equal to the distance of two adjacent image lines minus the width of the photodiode line. When reproducing frames of motion pictures with a film speed of 16⅔ frames per second, the motion of the tilting mirror is equal to ⅔ of the height of a frame.

The tilting-mirror system will, advantageously, be provided with a loop oscillator such as that known from galvanometric technology.

In a further embodiment, the oscillating mirror is driven by a summing amplifier having one input which is driven by a sawtooth voltage, and having another input being connected to a pulse shaping stage driven by the television line pulses. The rising flank of the sawtooth voltage allows continuous vertical frame scanning.

In a further embodiment of the invention, either the scanning device or the reproduction device contains a tilting-mirror system vertically reflecting the film frames or their images at the television standard frequency of 50 Hz. A light-directing arrangement transversely to the photodiode line and is arranged in the path of the line-shaped bundle of rays in front of the photodiode line of the charge coupled device. The cross section of the light-directing arrangement corresponds to the width of the photodiode line, which latter is driven by a control generator having a control frequency equal to the television line frequency.

In a still further embodiment, the oscillating light-directing arrangement is constructed as a piezoceramic oscillator. In a different embodiment, the oscillating light-directing arrangement will consist of a light-directing arrangement and a piezoelectric oscillator fixedly connected to it.

The reproduction device may include illuminated fiber optics illuminating the frame line-by-line or separating it in such a manner that in the first reproduction phase one respective line and the next line but one are illuminated, whilst in the second reproduction phase lines located between the previously illuminated are themselves illuminated.

Advantageously, the fiber optics will have optical stripes, spaced so that the distance between two adjacent stripes will be equal to the distance between two adjacent image lines. The fiber optics can be displaced from a first position (during the first scanning phase) by a drive system, into a second position during the second scanning phase, with the displacement being equal to the distance between two adjacent image lines.

In a particularly advantageous embodiment of the invention, either the reproduction device or the scanning device has an arrangement by which the film frames or their images will be continually vertically deflected at the television standard frequency of 50 Hz. The charge coupled device has a first control input for the purpose of image line integration. This first control input receives control pulses at the frequency of television lines and derives erasing pulse therefrom. These erasing pulses are displaced from the control pulses by a maximum of one-half period, and are routed to a second control input, for erasing the image-line signal after of a half-period of the television line pulses, with the signals integrated in the second half-period being evaluated. The charge integration of the signals will thus begin anew in the center of a television picture line and will last until the charge transfer pulses appear in the read-out shift register. This ensures that the signal will be integrated only for one television line. It is appropriate to take the width of the photodiode line of the charge control device into consideration. Seen timewise, the erasing pulse should be generated in the middle between two line pulses. Such erasing pulses may be obtained in a simple manner from the line pulses by pulse-delaying networks. The ratio between signal amplitude and resolution may be adjusted to an optimum value by an appropriate adjustment of the delay.

The second control input can be provided with a control connection to the photodiode line, whilst the first control input can be connected to a transfer gate interposed between the photodiode line and the read-out shift register of the charge-coupled device. In a further advantageous embodiment, the charge coupled device further includes, a read-out shift register, a transfer gate for the shift register, an intermediate memory, and a transfer gate for the intermediate memory. Television control pulses are transmitted to the shift register transfer gate, and erasing control pulses (displaced by a half-period) are transmitted to the intermediate memory. Meanwhile, a third train of control pulse signals, in phase with the television control pulses and having an additional pulse in its middle, is transmitted to the transfer gate for the intermediate memory. At the beginning of each television control pulse, or of each pulse in the third train, the image line signals will reach the read-out shift register via the intermediate memory, whilst the image line signals will be transferred to the intermediate memory, by every intermediate pulse in the third train. Image line signals are then subsequently erased by the erasing pulse, the erasing phase being adjustable herein. In another embodiment, it is also possible to locate a crystal in front of the photodiode line of the charge coupled device. Preferably, a ferromagnetic crystal, which is controllable in its transparency, is used. The crystal is alternately adjusted either to transmit light or block light, the adjustment frequency herein equal to the television line frequency.

BRIEF DESCRIPTION OF THE DRAWINGS

The invention is described using several of the embodiments shown in FIGS. 1 to 11.

DETAILED DESCRIPTION OF PREFERRED EMBODIMENTS

Figure 1:
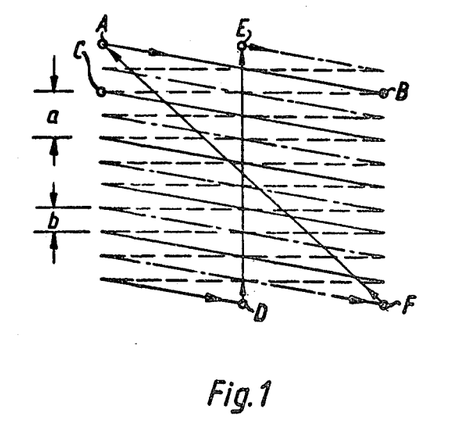
FIG. 1 is a schematic representation of the line interlacing method in television.

FIG. 1 shows the line interlacing method used in television for flicker-free image reproduction. The electron beam in the picture tube in the television receiver begins at point A. The beam reaches point B at the end of the line, and then jumps to C of the beginning next line but one, reaching the end of line 625 after 20 msec. However, the electron beam has traced out only 313 lines during these 20 msec. The electron beam thus traces out the first, third, and fifth lines and so on, forming a first half-frame. During next 20 msec the second, fourth, and sixth lines and so on will be traced out to form a second half-frame. The electron beam will then jump from point D to point E. The second half-frame is ended at point F. The distance between the loci of the television lines in a half-frame is denoted by a, and the distance between the loci in a full frame by b.

If the image of a film frame is continually moved by a tilting mirror across a photodiode line in a charge-coupled device or CCD, the travel distance of the image across the photodiode line during a line period of 64 $\mu$sec will be about 1/313 of the film frame, and will not be 1/625 of the film frame as would be required for complete television resolution. Depending upon the width of the photodiode line, the travel distance of the image should even be somewhat less than 1/625 of the frame.

Figure 2:
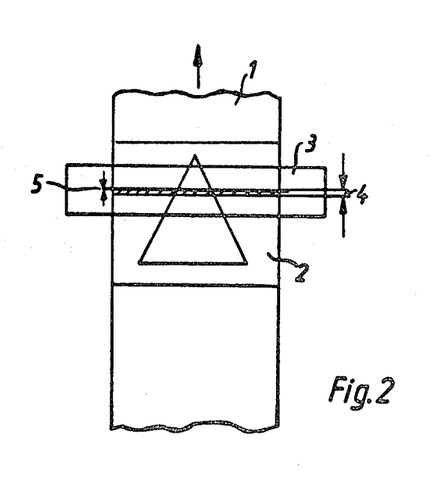
FIG. 2 relates the photodiode line of the charge-coupled device to the frame of a Super Eight film.

In FIG. 2, a strip of Super Eight film is denoted by 1, a Super Eight film frame by 2, an image pick-up for the charge-coupled device by 3, the travel of a Super Eight film frame during 64 $\mu$sec by 4, (this time corresponding to a television line period, and to 1/313 of a film frame.) 5 denotes the width of the photodiode line of the charge coupled device.

Figure 3:
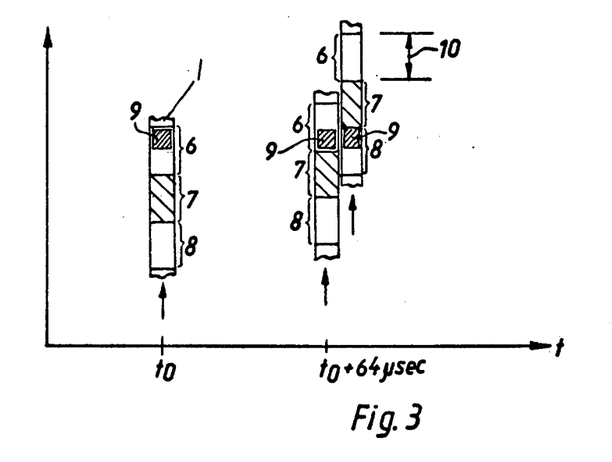
FIG. 3 shows the path of an image during one line period.

FIG. 3 depicts the timewise sequence of image motion. 6 denotes the first film frame line, 7 the second film frame line and 8 the third film frame line. A silicon element within the charge-coupled device is denoted by 9. At time $t_o$, the first part of the first image line is reproduced on element 9. The final part of the first image line is reproduced on element 9 after 64 $\mu$sec, the duration of a television line period. The first image line will subsequently jump vertically until the first part of the third image line is reproduced on element 9. Thus, only an integration of the charges of the signals of the first image line will take place during the line period of 64 $\mu$sec, and subsequently during the continued line period of the next line but one. The line height 10 of each image line corresponds to 1/625 of the film frame height. FIG. 3 also shows the motion sequence of the film frame reproduction required for full vertical television resolution.

Figure 4:
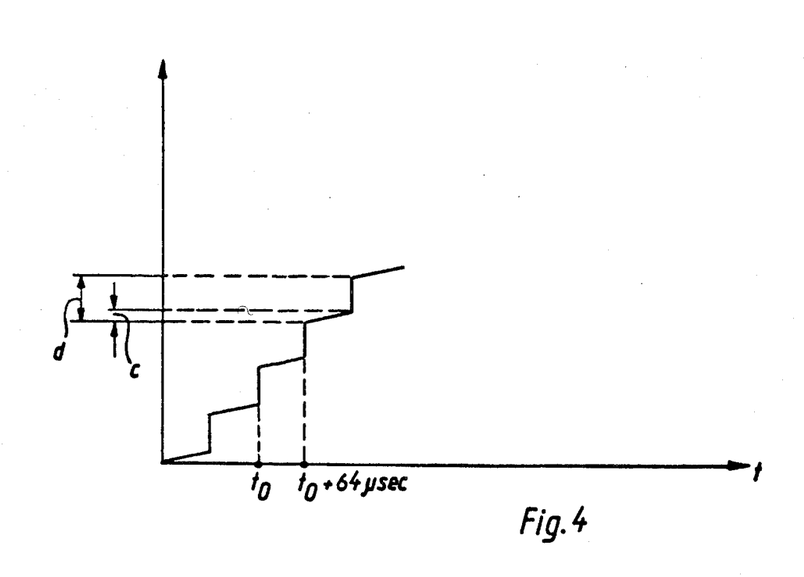
FIG. 4 shows the time-distance diagram of the motion of an ideal oscillating mirror.

FIG. 4 shows the distance-time diagram for the image movement or, respectively, for the oscillating mirror system controlling the image movement. During the integration phase, one film frame line will move a distance c in the direction of film motion, wherein c is equal to the 1/625 part of a film image less the width of the photodiode line in the charge-coupled device. At the end of a line period of 64 $\mu$sec, the film frame line is jerked vertically in the direction of film motion by a distance of d minus c, wherein d equals 1/313 of a film frame.

Figure 5:
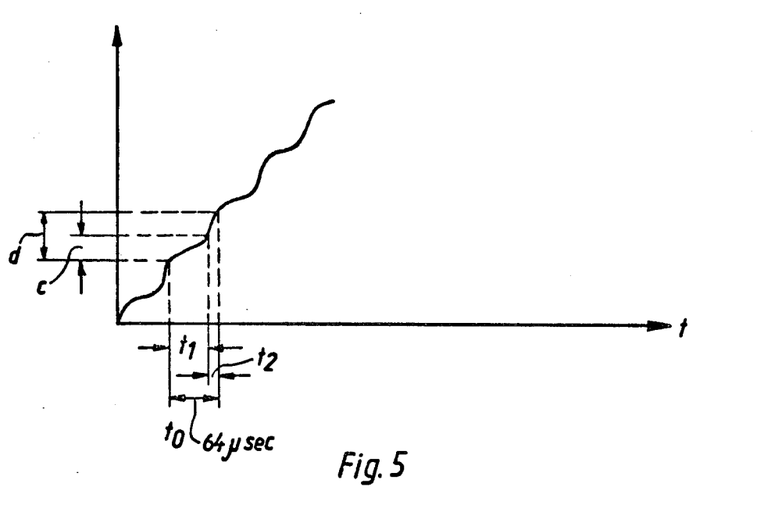
FIG. 5 shows an approximate time-distance diagram of the motion of an actual oscillating mirror.

If the frame line is of the same width as the photodiode line, the film frame line must remain stationary during the line period of 64 $\mu$sec, in order to abruptly skip vertically afterward, by amount d. Since momentums of inertia are usually to be dealt with in mechanical oscillating systems, the image motion, or, respectively, the oscillating mirror system will follow the curve shown in FIG. 5. Since the oscillating mirror of an oscillating-mirror arrangement may still track at a frequency of approximately 15 kHz, (television line frequency), an approximately sinusoidal distance-time characteristic with a superimposition of 15 kHz is obtained instead of the desired distance-time characteristic of FIG. 4. d again corresponds to 1/313 of the film frame, and c corresponds to 1/625 of a film frame. The c will be reached after time t1, whilst time value t2 is required for a distance of d minus c. The integration time of the photodiode line of the charged-coupled device over 1/625 of the film frame height here is about 75% of the television line period, whilst the integration time over the adjacent and undesired 1/625 part of the film frame will amount to only about 25% of the television line period. Thus, resolution in the vertical direction will be attained in a nearly complete manner.

Figure 6:
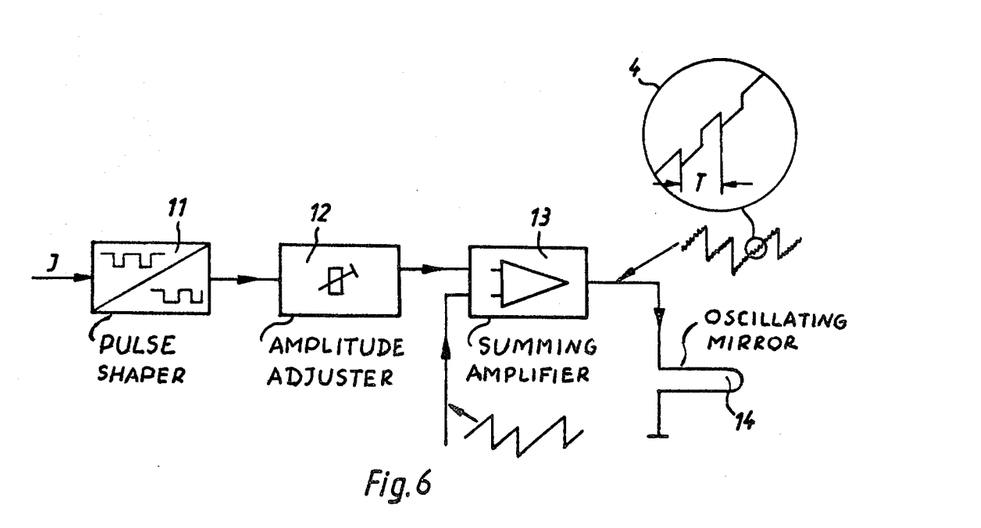
FIG. 6 shows a schematic diagram of the drive of the oscillating mirror.

In FIG. 6, television line pulses I reach a pulse-shaping stage 11 with an amplitude adjusting device 12 arranged thereafter. 13 denotes a summing amplifier, having one input connected to amplitude adjusting device 12, and having another input receiving a vertical deflecting sawtooth voltage. This sawtooth voltage is used to reproduce Super Eight film which moves vertically at a speed of 16⅔ frames per second. A vertical deflection sawtooth voltage with superimposed television line-pulse sequence of periods of 64 μsec is obtained at the output of summer amplifier 13. A partial zone of the sawtooth curve is shown enlarged within the circle H. 14 denotes the oscillating mirror.

Figure 7:
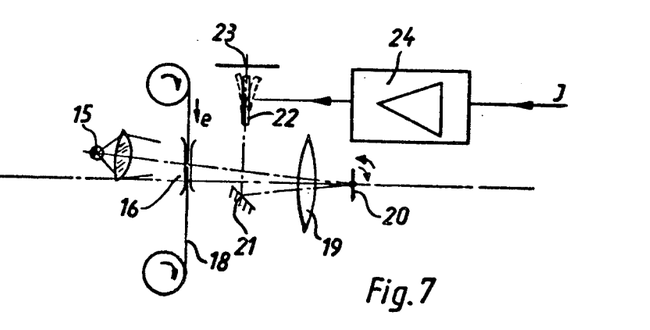
FIG. 7 shows a further embodiment of the invention with a piezoceramic oscillating element.

In FIG. 7, 15 denotes an illumination unit by which Super Eight film 18 is illuminated in front of a film stage 16, the film moving in the direction of the arrow e at a speed of 16⅔ frames per second. Optics 19, an oscillating mirror 20 and a deflecting mirror 21 are arranged behind the Super Eight film. A piezoceramic oscillating element 22 is located in the path of the optical rays, in front of the photodiode line of charge coupled device 23. The dimensions of transparent piezoceramic oscillating element 22 are adapted to the dimension of the photodiode line. The piezoceramic oscillating element 22 is driven by circuit 24 in which pulses having the period of television line pulses are, respectively, amplified or generated. Circuit 24 is triggered by television line pulse I. A thin light-directing rod, transforming the continuous reproduction motion into an abrupt linear motion is used for the piezoceramic oscillating element.

Figure 8:
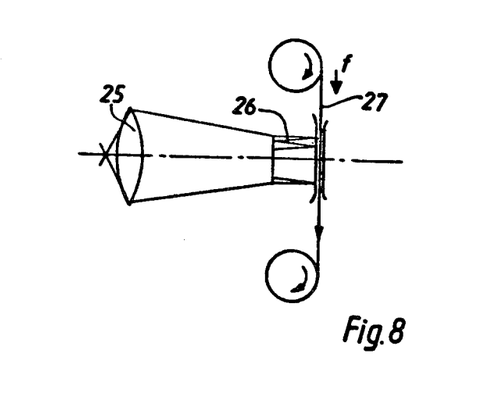
FIG. 8 shows an embodiment of the invention using fiber optics provided between the illuminating device and the image.
Figure 9:
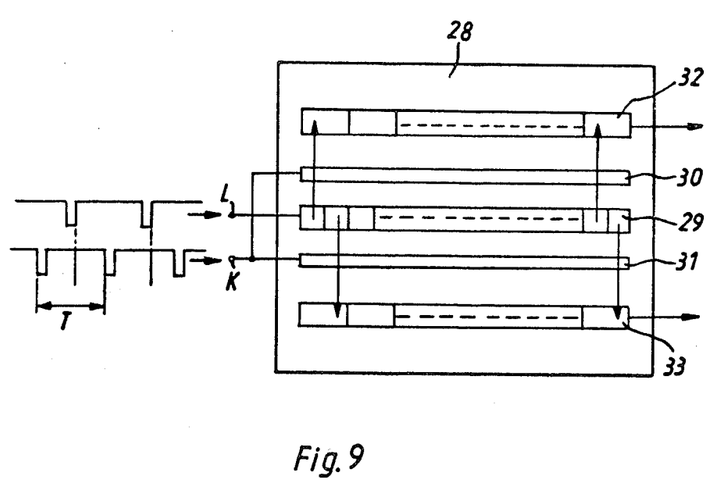
FIG. 9 shows a further embodiment providing erasure of the signals during a half-period of the television line signals.

In FIG. 8, 25 denotes an illuminating device, illuminating the fiber optics which direct the incoming light linewise onto the film frame of Super Eight film 27 moving in direction f. Thus 1/625 of the film frame is illuminated at alternating locations, whilst the adjoining fiber optics line remains dark, the latter also amounting to 1/625 of the film frame. Since the film image will move during one television line period by the distance of two lines, with the second of these lines not being illuminated, the photodiode line of the charge-coupled device will only receive the light from one line. During the second reproduction phase, sequential illumination of the film frame ensues line-by-line, between the previously illuminated lines. In the embodiment of FIG. 9, 28 denotes a charge coupled device having a photodiode line 29. Connections originating at photodiode line 29 lead over transfer gates 30 and 31 to shift registers 32 and 33. Pulsing of the charge coupled device 28 ensues through input K, which is connected to two transfer gates 30 and 31. A rectangular voltage of a period T equalling 64 μsec of the television line period, is used as a pulsing signal. A further input L of the charge-coupled device is connected with the photodiode line 29.

This input L receives rectangular pulses which are displaced by a half-period relative to the television line pulses. These displaced pulses serve as erasing pulses and are of the same frequency as the television line pulses.

Figure 10:
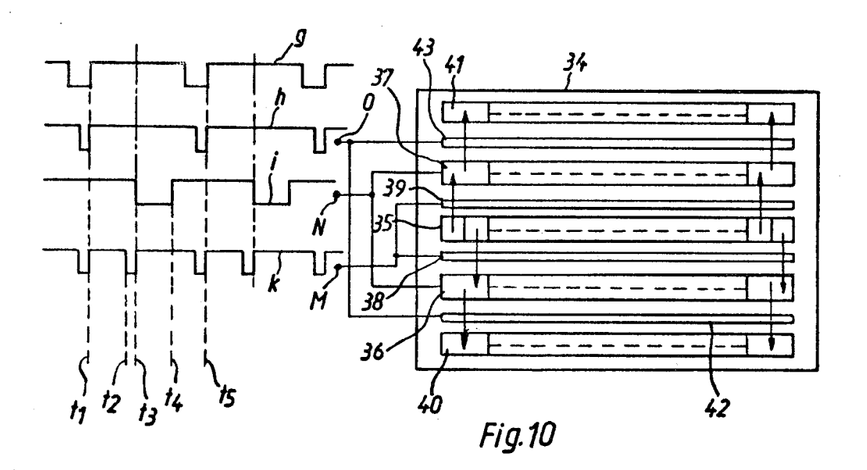
FIG. 10 shows a further embodiment with an intermediate memory provided in the charge control device.

This circuit will reduce by half the light integration time of the photodiode line during a tele a line period, meaning that the charge accumulated during half a line period is erased. Photodiode line 29 in FIG. 9 is given an erasing pulse in the middle between two line pulses. Charge integration begins anew in the middle of a television line and will continue until the arrival of the charge transfer pulses (television line pulses) transferring the charges of the photodiode line (via transfer gates 30 and 31) to read-out shift registers 32 and 33. This ensures that the luminance signal is integrated only for the duration and length of one television line, and that the luminance signal of the adjacent television line is erased during the first reproduction phase. In order to take the width of the photodiode line into account, the erasing pulse should arrive or be applied after a half-period has elapsed. Erasing pulses may be generated from line pulses by simple pulse-delaying circuits. Adjustment of the delay time allows the most favorable ratio between signal amplitude and resolution to be selected. In the embodiment of FIG. 10, 34 denotes a charge-coupled device containing a photodiode line 35, a first intermediate memory 36, a second intermediate memory 37, and transfer gates 38 and 39. Transfer gates 38 and 39 are located between photodiode line 35 and intermediate memories 36 and 37. A first read-out shift register is denoted by 40, and a second read-out shift register by 41. Transfer gates 42 and 43 are provided, respectively, between intermediate memory 36 and shift register 40, and read-out shift register 41 and intermediate memory 37. Transfer gates 38 and 39 are connected to a common control input M. Intermediate memories 36 and 37 are jointly connected to a control input N. Transfer gates 42 and 43 have a common control input O. A pulse train h is generated from the television line pulse train g and applied to input O. Input O is connected to the transfer gates 42 and 43. A pulse train i, phase shifted from the television line impulse sequence g by a half-period, and of the same frequency, is applied to input N. Input N is connected to intermediate memories 36 and 37. Pulse train k has, timewise, an intermediate pulse between the beginnings of two adjacent lines, which intermediate pulse is situated in the middle of the period. The three pulse trains h, i and k enable transfer of charges from photodiode line 35 at time t1 to read-out shift registers 40 and 41, via intermediate memories 36 and 37. At time t2, charges from photodiode line 35 are transferred, via transfer gates 38 and 39, to intermediate memorys 36 and 37. At time t3, intermediate memories 36 and 37 are erased. The erasing phase is terminated at time t4. Integration of the charges from photodiode line 35 ensues between times t4 and t5, with subsequent retransmission of the charges to read-out shift registers 40 and 41. Transfer gates 38 and 39 will receive a transmission pulse after a half-line period, by which transmission pulse the charges accummulated are transported only into intermediate memory 36 or, respectively, 37. They are erased therefrom shortly thereafter by erasing pulse train i: The photodiode line will thus integrate anew each time, beginning at approximately the center of the television line pulses. Only charges that correspond to the luminance signal from a respective television line can reach read-out shift registers 40 and 41, whereby full vertical television resolution is accomplished.

Figure 11:
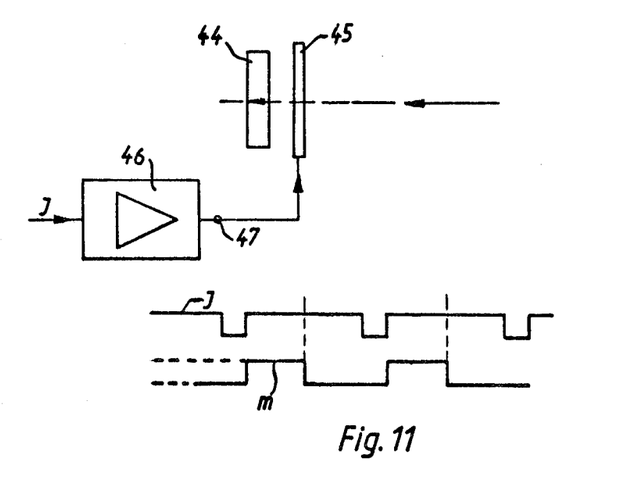
FIG. 11 shows an embodiment with an adjustable crystal in front of the photodiode line of the charge-coupled device.

In the embodiment of FIG. 11, 44 denotes a charge-coupled device located behind a crystal, which is preferably a ferromagnetic crystal that can vary in transparency in accordance with a signal from; pulse generator 46. Pulse generator 46 is triggered by control pulses of television line frequency. A control voltage is present at output 47 of pulse generator 46, as can be seen from the curve m. The controllable crystal will be made opaque for one half of a television line period, whilst during the other half of the line period it will be transparent.

We claim:

1. An electronic image scanner for scanning images and generating high-resolution video signals therefrom, comprising:

an elongated image sensor upon which successive frame lines of images can be projected, the image sensor scanning frame lines in such images and generating in response to each frame line projected onto the elongated image sensor a frame line signal containing the image information of the projected frame line;

a signal processor responsive to the frame line signals generated by the elongated image sensor and generating a full-frame video signal which includes a first field and a second field; and control means controlling the signal processors and controlling the projection of successive frame lines of an image onto the image sensor and operation in a manner that during production by said signal processor of the first field during a first reproduction phase a first subset of alternating frame lines of an image are consecutively projected onto the elongated image sensor, and during production by said signal processor of the second field during a subsequent second reproduction phase, a second subset of alternating frame lines of an image are consecutively projected onto the elongated image sensor.

2. The scanner defined by claim 1, wherein the image sensor is a charge-coupled device having a row of photodiodes.

3. The scanner defined by claim 2, wherein the charge-coupled device has a clocked input, an erase input and at least one output, the clocked input being synchronized with a standard television line frequency and causing the frame line signal to be developed at said at least one output when a clock pulse appears at the clocked input, and the erase input causing charges developed by the charge-coupled device to be erased when an erase pulse appears at the erase input.

4. The scanner defined by claim 3, further including an erase pulse network deriving erase pulses from the clock pulses in a manner that the erase pulses are phase shifted by at least half of a standard television line period relative to the clock pulses, whereby charges developed during a last half-period of a standard television line form the frame line signal.

5. The scanner defined by claim 4, further including:

at least one shift register, each said at least one shift register being connected to a corresponding one of said at least one output and to a corresponding one of said at least one first transfer gate;

at least one intermediate memory, each said at least one memory being interposed between a corresponding one of said at least one first transfer gate in a manner that charges in said at least one intermediate memory can be transmitted to said at least one shift register through said at least one first transfer gate; and at least one second transfer gate, each said at least one transfer gate being interposed between the row of photodiodes and a corresponding one of said at least one intermediate memory, whereby charges developed in the row of photodiodes can be transmitted to said at least one intermediate memory through said at least one second transfer gate.

6. The scanner defined by claim 5, wherein said at least one intermediate memory is connected to the erase input.

7. The scanner defined by claim 3, wherein the charge-coupled device includes at least one first transfer gate connected to the clock input.

8. The scanner defined by claim 1, the control means including a deflecting system deflecting projected images across the image sensor at a rate correlated with a standard television line frequency.

9. The scanner defined by claim 8, wherein the deflecting system deflects each image across the image sensor twice during generation of a full-frame video signal, a first such deflection taking place during the first reproduction phase, and a second such deflection taking place during the second reproduction phase.

10. The scanner defined by claim 8, wherein the deflecting system comprises an oscillating mirror.

11. The scanner defined by claim 10, further including a mirror drive oscillating the oscillating mirror in accordance with a two-component signal, which signal contains a sawtooth wave component and a shaped component, and wherein the shaped component is derived from a standard television line signal.

12. The scanner defined by claim 11, wherein the two-component signal is produced by a summing amplifier having two inputs, the sawtooth wave component being routed to a one of said inputs and the shaped component being routed to another of said inputs.

13. The scanner defined by claim 8, wherein the deflecting system includes a galvanometric loop oscillator.

14. The scanner defined by claim 8, the control means further including a light guide system located in front of the image sensor and directing a projected image thereupon, the light guide system oscillating transversely to the image sensor at a rate correlated with a standard television line frequency and guiding light from frame lines in the image onto the image sensor in accordance with oscillation of the light guide system.

15. The scanner defined by claim 14, wherein the light guide system includes a piezoceramic oscillator.

16. The scanner defined by claim 14, wherein the light guide system includes a light guide unit and a piezoelectric oscillator fixed thereto.

17. The scanner defined by claim 1, the control means including fiber optics illuminating a transparency having an image which is to be scanned, the fiber optics illuminating the first subset of alternating frame lines in the transparency during the first reproduction phase and illuminating the second subset of alternating frame lines in the transparency during the second reproduction phase.

18. The scanner defined by claim 17, wherein the fiber optics includes a plurality of fibers spaced apart from each other by a distance equal to an interline spacing between two adjacent frame lines within one of the subsets, and wherein the scanner further includes a fiber optic drive displacing the fibers between a first position in which the fibers are aligned with frame lines in the first subset and a second position in which the fibers are aligned with frame lines in the second subset.

19. The scanner defined by claim 1, the control means including a crystal located in front of the image sensor, the crystal having a transparency which can be varied between a transparent state and an opaque state in response to application of a control voltage.

20. The scanner defined by claim 19, further including a driver generator connected to the crystal and applying a control voltage thereto in a manner that the crystal assumes the transparent state during a first part of a standard television line period and assumes the opaque state during a second part of a standard television line period.

* * * * *